United States Patent
Chen et al.

(10) Patent No.: US 8,015,688 B2
(45) Date of Patent: Sep. 13, 2011

(54) METHOD AND APPARATUS FOR HEMMING AND SEALING A JOINT

(75) Inventors: Yen-Lung Chen, Troy, MI (US); John E. Carsley, Clinton Township, MI (US); Mark W. Verbrugge, Troy, MI (US); Xiaohong Q. Gayden, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1475 days.

(21) Appl. No.: 11/427,822

(22) Filed: Jun. 30, 2006

(65) Prior Publication Data
US 2008/0000071 A1    Jan. 3, 2008

(51) Int. Cl.
*B23P 11/00* (2006.01)
(52) U.S. Cl. ............ 29/509; 29/505; 29/525.14; 29/700; 901/41; 901/42; 901/43
(58) Field of Classification Search .......... 29/505, 29/509, 525.14, 700; 901/41, 42, 43
See application file for complete search history.

(56) References Cited

U.S. PATENT DOCUMENTS

| 5,897,796 A * | 4/1999 | Forrest ............... 219/121.64 |
| 5,948,185 A | 9/1999 | Krajewski et al. ......... 148/698 |
| 6,477,879 B1 | 11/2002 | Sawa .......................... 72/220 |
| 6,672,121 B2 | 1/2004 | Carsley et al. .................. 72/57 |

FOREIGN PATENT DOCUMENTS

JP          2004167525 A  *  6/2004

\* cited by examiner

*Primary Examiner* — Derris H Banks
*Assistant Examiner* — Azm Parvez

(57) ABSTRACT

An apparatus and method is provided for hemming together a pair of panels and immediately sealing the hemmed joint against the intrusion of moisture. A tool mount is attached to a multi-axis manipulator such as a robot for moving the tool mount along the edge portions of the panels. A hemming roller is mounted on the tool mount and adapted to be moved along the edge portions of the panels by the multi axis manipulator to fold the flanged edge portion of the outer panel onto the edge portion of inner panel as the tool mount traverses the edge portions of the panels. A sealing mechanism is mounted on the tool mount adjacent to the hemming roller to seal the hemmed joint immediately after the flanged edge portion is folded onto the inner panel. The sealing mechanism may be a dispenser of adhesive sealer or a friction stir welder.

28 Claims, 2 Drawing Sheets

METHOD AND APPARATUS FOR HEMMING AND SEALING A JOINT

FIELD OF THE INVENTION

The present invention relates to joining the edges of inner and outer body panels by a hemmed joint, and more particularly provides for both the hemming of the joint and the sealing of the joint against moisture intrusion.

BACKGROUND OF THE INVENTION

It is well known in the manufacture of motor vehicle panels, for example an engine compartment hood, to attach an inner panel and an outer panel via a hemmed joint in which a flange provided on the outer panel is bent over an edge portion of the inner panel. It is also well known to seal such a hem joint by applying a bead of sealer along the edge of the bent over flange so that moisture cannot intrude into the hem joint and corrode the metals.

It would be desirable to obtain improvements in the methods and apparatus for forming and sealing hem joints in order to improve manufacturing efficiencies in the automobile industry as well as improve product quality.

SUMMARY OF THE INVENTION

An apparatus and method is provided for hemming together a pair of panels and immediately sealing the hemmed joint against the intrusion of moisture. A tool mount is attached to a multi-axis manipulator such as a robot for moving the tool mount along the edge portions of the panels. A hemming roller is mounted on the tool mount and adapted to be moved along the edge portions of the panels by the multi-axis manipulator to fold the flanged edge portion of the outer panel onto the edge portion of inner panel as the tool mount traverses the edge portions of the panels. A sealing mechanism is mounted on the tool mount adjacent to the hemming roller to seal the hemmed joint immediately after the flanged edge portion is folded onto the inner panel. The sealing mechanism may be a dispenser of adhesive sealer or a friction stir welder.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
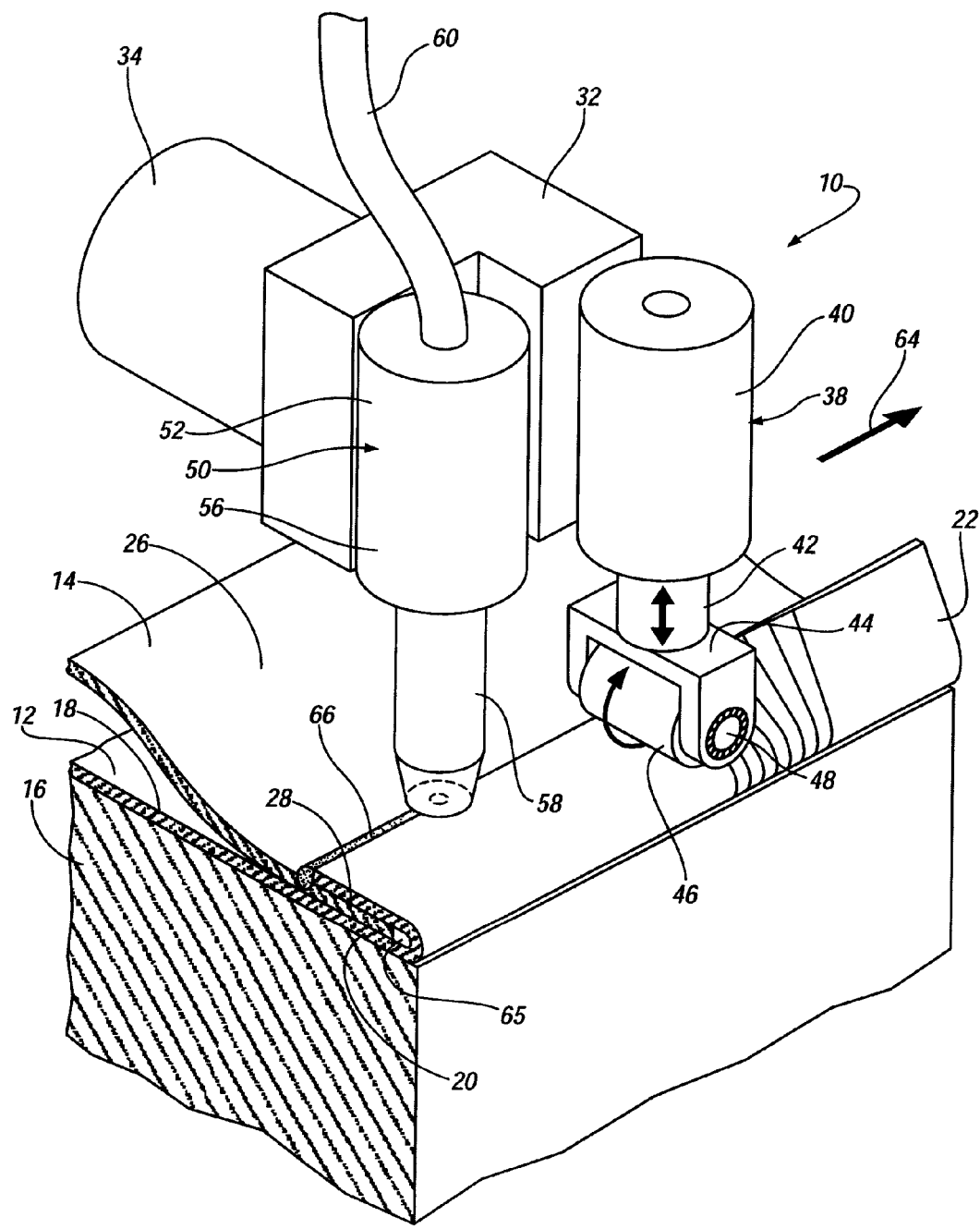
FIG. 1 is an isometric pictorial view of an apparatus for making a hemmed joint between inner and outer panels and then immediately sealing the joint against intrusion of moisture; and, FIG. 2 is an isometric pictorial view of a second embodiment of an apparatus for making a hemmed joint between inner and outer panels and then immediately sealing the joint against intrusion of moisture.

Referring to FIG. 1, a hemming and sealing apparatus, generally indicated at 10, is provided for joining an outer body panel 12 and an inner body panel 14.

The outer panel 12 includes a planar portion 18 and an edge portion 20 that has a flange 22 that extends at an approximately 90 degree angle from the planar portion 18 of the outer panel 12. The inner panel 14 has a planar portion 26 and an edge portion 28.

As seen in FIG. 1, the outer panel 12 is supported by an anvil 16. The inner panel 14 is then placed upon the outer panel 12, with the edge portion 28 of the inner panel 14 contacting the edge portion 20 of the outer panel 12 adjacent to the flange 22. If desired, an adhesive or sealer may be dispensed between the outer panel 12 and the inner panel 14 as the inner panel 14 is placed upon the outer panel 12, as known in the prior art.

The hemming and sealing apparatus 10 includes a tool mount 32 that is mounted on a multi-axis manipulator, preferably a robot 34. A roller hemmer device 38 is mounted on the tool mount 32 and includes an actuator 40, rod 42, clevis 44, and roller 46. The roller 46 is rotateably mounted on the clevis 44 by a shaft 48. The clevis 44 is mounted on the end of rod 42, and the rod 42 can be adjusted in the vertical direction by the actuator 40. The actuator 40 is preferably a pneumatic or hydraulic cylinder, but may be any commercially available actuator for adjusting the position of the clevis 44 and roller 46.

The hemming and sealing apparatus of FIG. 1 also has a sealing device 50, more particularly a sealant dispenser 52 that is mounted on the tool mount 32 adjacent the roller hemmer device 38. The sealant dispenser 52 includes a sealant valve 56 and a nozzle 58. A hose 60 is connected to the sealant valve 56 and also connected to a supply of sealant.

As seen in FIG. 1, the method for joining and sealing the panels includes the positioning of the outer panel 12 and inner panel 14 upon the anvil 16 and suitably clamping the panels against movement. The robot 34 then causes the tool mount 32 to traverse the edges of the panels in the direction of arrow 64. The roller hemming device 38 will forcibly bend the flange 22 of the outer panel 12 into tight fitting engagement of the edge portion 28 of the inner panel 14 as the roller 46 travels in the direction of arrow 64. The actuator 40 can adjust the position of the roller 46 as needed to maintain a desired level of bending force.

Just after the flange 22 has been bent down to form the hem joint, the sealant dispenser 52 will lay down a bead of sealer 66 along the edge of the flange 22 at its line of contact with the edge portion 28 of the inner panel 14. Thus the hem joint is formed and immediately sealed, and the hemming and sealing operations are completed in the final traverse of the tool mount 32 by the robot 34.

It will be appreciated that upon curing of the sealant bead 66, the roller hemmed joint will be effectively sealed and moisture cannot reach the small void 65 that exists between the outer panel 12 and the inner panel 14. In addition the cured sealer 66 may act as an adhesive to prevent the later separation of the hemmed joint.

Figure 2:
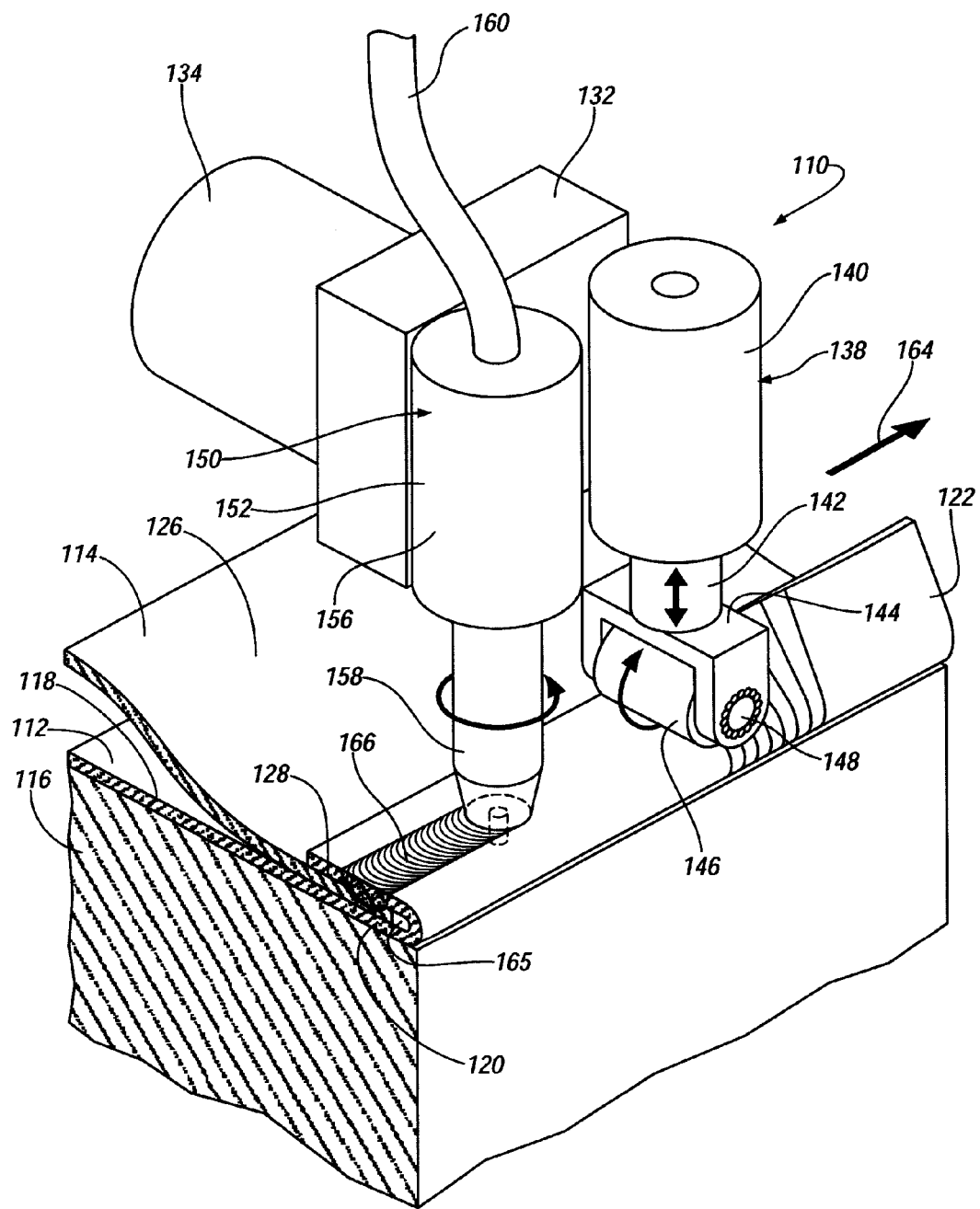

FIG. 2 shows another embodiment of the hemming and sealing apparatus, in particular a hemming and sealing apparatus, generally indicated at 110, for joining and sealing an outer body panel 112 and an inner body panel 114.

The outer panel 112 includes a planar portion 118 and an edge portion 120 that has a flange 122 that extends at an approximately 90 degree angle from the planar portion 118 of the outer panel 112. The inner panel 114 has a planar portion 126 and an edge portion 128.

As seen in FIG. 2, the outer panel 112 is supported by an anvil 116. The inner panel 114 is then placed upon the outer panel 112, with the edge portion 128 of the inner panel 114 contacting the edge portion 120 of the outer panel 112 adjacent to the flange 122.

The hemming and sealing apparatus 110 includes a tool mount 132 that is mounted on a multi-axis manipulator, preferably a robot 134. A roller hemmer device 138 is mounted on the tool mount 132 and includes an actuator 140, rod 142, clevis 144, and roller 146. The roller 146 is rotateably mounted on the clevis 144 by a shaft 148. The clevis 144 is mounted on the end of rod 142, and the rod 142 can be adjusted in the vertical direction by the actuator 140. The actuator 140 is preferably a pneumatic or hydraulic cylinder, but may be any commercially available actuator for adjusting the position of the clevis 144 and roller 146.

The hemming and sealing apparatus of FIG. 2 also has a sealing device 150, more particularly a friction stir welder 152 that is mounted on the tool mount 132 adjacent the hemmer device 138. The friction stir welder 152 includes a high speed motor 156 that turns a tool 158. Power cable 160 is connected to the high speed motor 156.

As seen in FIG. 2, the method for joining and sealing the panels includes the positioning of the outer panel 112 and inner panel 114 upon the anvil 116 and suitably clamping the panels against movement. The robot 134 then causes the tool mount 132 to traverse the edges of the panels in the direction of arrow 164. The roller hemming device 138 will forcibly bend the flange 122 of the outer panel 112 into tight fitting engagement of the edge portion 128 of the inner panel 114 as the roller 146 travels in the direction of arrow 164. The actuator 140 can adjust the position of the roller 146 as needed to maintain a desired level of bending force. Just after the flange 122 has been bent down to form the hem joint, the friction stir welder 152 will create a friction stir weld 166 along the flange 122. In particular, the high speed motor 156 turns the tool 158 at high speed and the tool is forced into the flange 122 with sufficient force to create heating and plasticizing of the metals of the outer panel 112 and inner panel 114. Upon cooling of the heated metal, FIG. 2 shows that a friction stir weld 166 has been formed to bond the flange 122 of the outer panel 112 to the edge portion 128 of the inner panel 114, and thereby create a seal so that moisture cannot reach the small void 165.

Alternatively, depending upon the tool design, the degree of heating of the metals and the extent of the downward force applied to the tool 158, the weld 166 may reach entirely through the edge portion 128 of the inner panel 114 and partially into the edge portion 120 of the outer panel 112. This formation of the friction stir weld to create a weld between the inner panel edge portion 128 and both the flange 122 and the edge potion 120 of the outer panel 112 enhances the prevention of moisture intrusion by sealing both sides of the inner panel edge portion 128. However, the depth of the friction stir weld 166 must be carefully controlled in order to avoid its being visible after the outer panel 112 is painted and installed on the vehicle.

Although FIG. 2 shows the friction stir weld applied approximately in the center of the flange 122, it will be understood that the friction stir weld may be formed as a fillet weld along the very edge of flange 122, just as the sealant bead 66 was installed along the very edge of the flange 22 in FIG. 1.

It will be appreciated that the friction stir weld 166 will effectively seal the hemmed joint against the intrusion of moisture, and also effectively lock the hem joint against separation.

The description of the invention is merely exemplary in nature and, thus, variations thereof are intended to be within the scope of the invention. For example, in order to facilitate control of the sealing device, whether it is a sealant dispenser or a friction stir welder, it may be desirable to provide a linear actuator for mounting the sealing device on the tool mount 32 and 132. Otherwise, the control of the position of the sealing device can be accomplished by the normal manipulation of the robot. The robot articulates the tool mount along a complex path so that the hemming roller device and the sealing device can each follow its own path, for example to follow along the curvature of the door panel, and to accommodate the hem flanging and sealing operations as the tool mount traverses the corners of the door.

In addition, it will be understood that the hemming device 10 and 110 is not limited to being a simple roller as shown in the drawings herein, but rather may be the more sophisticated roller hemming apparatus of U.S. patent application Ser. No. 11/093,383, filed Mar. 30, 2005, assigned to the assignee of this application, and which is hereby incorporated herein by reference. Other hemming roller devices known in the prior art may also be employed. For example, the prior art recognizes that it may be desirable to have a hemming roller make a first traverse of the panel edges to bend the flange 45 degrees and to then have the hemming roller make a second traverse to bend the flange into full contract with the edge portion of the inner panel. In this case, the sealing device, whether a sealant dispenser or a friction stir welding tool, will be actuated only upon the final traverse of the hemming tool.

Furthermore, the sealing operation of the friction stir welder can be performed separately from the hemming operation, i.e., the friction stir welding operation can be used to seal any already hemmed joints.

What is claimed is:

1. Apparatus for simultaneously hemming together a pair of panels by bending a flanged edge portion of one of the panels over the edge portion of the other panel to create a hemmed joint and sealing the hemmed joint against the intrusion of moisture, comprising:
   a tool mount attached to a single multi-axis manipulator for moving the tool mount along the edge portions of the panels;
   a hemming roller mounted on the tool mount and adapted to be moved along the edge portions of the panels by the multi-axis manipulator and to fold the flanged edge portion of the one panel onto the edge portion of the other panel as the tool mount traverses the edge portions of the panels;
   and a sealing mechanism mounted on the tool mount adjacent to the hemming roller to seal the flanged edge portion to the edge portion immediately after the flanged edge portion is folded onto the edge portion.

2. The apparatus of claim 1 in which the sealing mechanism is a dispenser of adhesive sealer to dispense the sealer onto the hemmed joint.

3. The apparatus of claim 1 in which the sealing mechanism is a friction stir welding tool that creates a friction stir weld between the flanged edge portion of the one panel and the edge portion of the other panel.

4. The apparatus of claim 3 in which the friction stir weld is of a depth sufficient to also weld the edge portion of the other panel to the edge portion of the one panel.

5. The apparatus of claim 1 in which the multi-axis manipulator is a robot.

6. The apparatus of claim 1 in which the hemming roller is mounted on the tool mount by an actuator so that the hemming roller may be adjusted in position relative to the sealing mechanism.

7. The apparatus of claim 1 in which the sealing mechanism is a dispenser of adhesive sealer to dispense sealer onto the hemmed joint.

8. The apparatus of claim 1 in which the sealing mechanism is a friction stir welding tool that creates a friction stir weld between the flanged edge portion of the one panel and the edge portion of the other panel.

9. The apparatus of claim 8 in which the friction stir weld is of a depth sufficient to also weld the edge portion of the other panel to the edge portion of the one panel.

10. Apparatus for simultaneously hemming together a pair of panels by bending a flanged edge portion of one of the panels over the edge portion of the other panel to create a hemmed joint and sealing the hemmed joint against the intrusion of moisture, comprising:
   a tool mount attached to a single multi-axis manipulator for moving the tool mount along the edge portions of the panels;
   a hemming roller mounted on the tool mount and adapted to be moved along the edge portions of the panels by the multi-axis manipulator and to fold the flanged edge portion of the one panel onto the edge portion of the other panel as the tool mount traverses the edge portions of the panels;
   and a friction stir welding mechanism mounted on the tool mount adjacent to the hemming roller to seal the flanged edge portion of the one panel to the edge portion of the other panel immediately after the flanged edge portion of the one panel is folded onto the edge portion of the other panel.

11. The apparatus of claim 10 in which the hemming roller includes a plurality of rollers each of which bends the flanged edge portion part way onto the edge portion as the tool mount traverses the edge portions of the panels.

12. A method of hemming the flanged edge portions of one panel over the edge portion of another panel comprising:
   using a multi-axis manipulator to traverse a tool mount along the edge portions of the panels with a tool having a hemming roller and a sealing mechanism mounted side by side so that the hemming roller first folds the flanged edge of the one panel over the edge portion of the other panel and then the sealing mechanism immediately seals the flanged edge to the edge portion of the other panel.

13. The method of claim 12 in which the sealing mechanism is a dispenser of adhesive sealer to dispense a sealer onto the hemmed joint.

14. The method of claim 12 in which the sealing mechanism is a friction stir welding tool that creates a friction stir weld between the flanged edge portion of the one panel and the edge portion of the other panel.

15. The method of claim 14 in which the one panel is an outer panel and the other panel is an inner panel, and the friction stir weld is created both between the flanged edge portion of the outer panel and the edge portion of the inner panel, and between the edge portion of the inner panel and the outer panel.

16. The method of claim 12 in which the multi-axis manipulator is a robot.

17. The method of claim 16 in which the friction stir welding device creates a friction stir weld between the flanged edge portion of the one panel and the edge portion of the other panel.

18. The method of claim 16 in which the one panel is an outer panel and the other panel is an inner panel, and the friction stir weld is created both between the flanged edge portion of the outer panel and the edge portion of the inner panel, and between the edge portion of the inner panel and the outer panel.

19. Apparatus for simultaneously hemming together a pair of panels by bending a flanged edge portion of one of the panels over the edge portion of the other panel to create a hemmed joint and sealing the hemmed joint against the intrusion of moisture, comprising: a tool mount attached to a robot for moving the tool mount along the edge portions of the panels; at least one hemming roller and a sealing mechanism mounted adjacent one another on the tool mount so that the robot moves the hemming roller and the sealing mechanism along the edge portions of the panels; said hemming roller acting to fold the flanged edge portion of the one panel onto the edge portion of the other panel as the tool mount traverses the edge portions of the panels and the sealing mechanism acting to seal the flanged edge portion to the edge portion immediately after the flanged edge portion is folded onto the edge portion.

20. The apparatus of claim 1 in which the sealing mechanism is a dispenser of adhesive sealer to dispense the sealer onto the hemmed joint.

21. The apparatus of claim 1 in which the sealing mechanism is a friction stir welding tool that creates a friction stir weld between the flanged edge portion of the one panel and the edge portion of the other panel.

22. The apparatus of claim 1 in which the hemming roller is mounted on the tool mount by an actuator so that the hemming roller may be adjustably positioned on the tool mount relative to the position of the sealing mechanism.

23. The apparatus of claim 1 in which the hemming roller includes a plurality of rollers each of which bends the flanged edge portion of the one panel part way onto the edge portion of the other panel as the tool mount traverses the edge portions of the panels.

24. The apparatus of claim 1 in which the sealing mechanism is a dispenser of adhesive sealer to dispense sealer onto the hemmed joint.

25. The apparatus of claim 1 in which the sealing mechanism is a friction stir welding tool that creates a friction stir weld between the flanged edge portion of the one panel and the edge portion of the other panel.

26. Apparatus for simultaneously hemming together a pair of panels by bending a flanged edge portion of one of the panels over the edge portion of the other panel to create a hemmed joint and sealing the hemmed joint against the intrusion of moisture, comprising: a tool mount attached to a robot for moving the tool mount along the edge portions of the panels; at least one hemming roller and a sealing mechanism mounted adjacent one another on the tool mount so that the robot moves the hemming roller and the sealing mechanism along the edge portions of the panels; said hemming roller being mounted on the tool mount by an actuator so that the hemming roller may be adjustably positioned on the tool mount relative to the position of the sealing mechanism on the tool mount, said hemming roller acting to fold the flanged edge portion of the one panel onto the edge portion of the other panel as the tool mount traverses the edge portions of the panels and the sealing mechanism acting to seal the flanged edge portion to the edge portion immediately after the flanged edge portion is folded onto the edge portion.

27. The apparatus of claim 1 in which the sealing mechanism is a dispenser of adhesive sealer to dispense the sealer onto the hemmed joint.

28. The apparatus of claim 1 in which the sealing mechanism is a friction stir welding tool that creates a friction stir weld between the flanged edge portion of the one panel and the edge portion of the other panel.

* * * * *